United States Patent [19]

Zierhut

[11] Patent Number: 4,827,133

[45] Date of Patent: May 2, 1989

[54] INFRARED SPACE SURVEILLANCE DETECTOR CIRCUIT

[75] Inventor: Hermann Zierhut, Munich, Fed. Rep. of Germany

[73] Assignee: Richard Hirschmann Radiotechnisches Werk, Fed. Rep. of Germany

[21] Appl. No.: 920,383

[22] Filed: Oct. 20, 1986

[30] Foreign Application Priority Data

Oct. 19, 1985 [DE] Fed. Rep. of Germany ....... 3537316

[51] Int. Cl.⁴ ........ G01J 5/00

[52] U.S. Cl. ........ 250/338.4; 250/338.3; 328/6; 307/308; 307/580; 340/577

[58] Field of Search ........ 307/308, 580; 340/560, 340/555; 250/316-319, 330-334, 338

[56] References Cited

U.S. PATENT DOCUMENTS

| | | | |
|---|---|---|---|
| 3,875,433 | 4/1975 | Uchikawa | 340/562 |
| 3,944,859 | 3/1976 | Hoover | 307/580 |
| 3,987,319 | 10/1976 | Nirschl | 307/580 |
| 4,267,468 | 5/1981 | Hilliker | 307/580 |
| 4,367,408 | 1/1983 | Imai et al. | 250/338 |
| 4,618,770 | 10/1986 | Maile | 250/338 R |

FOREIGN PATENT DOCUMENTS

| | | |
|---|---|---|
| 2819183 | 5/1978 | Fed. Rep. of Germany . |
| 3404151 | 2/1984 | Fed. Rep. of Germany . |

OTHER PUBLICATIONS

"Grundlagen, Ausfuhrung und Beurteilung von Ionisations—Rauchmeldern", Dr. Gerhard Meyer, Mar. 1983.

European Search Report.

Israel, Helmut, "Aufspueren von Infrarotstrahlen", Bauelemente, Funkschau, 4/1982, pp. 61-65.

Das FET-Kochbuch-Herausgegben von, Texas Instruments, Deutschland GmbH, pp. 196-201.

*Primary Examiner*—Stanley D. Miller
*Assistant Examiner*—Nancy Thai
*Attorney, Agent, or Firm*—Robert J. Koch

[57] ABSTRACT

A circuit layout for an infrared space surveillance detector with a sensor and a field effect transistor following the sensor. An operational amplifier with a negative input is connected to the drain electrode of a field effect transistor. The output signal of the operational amplifier is fed back to its negative input. The stabilization of the operating voltage by the operational amplifier is utilized and the drain electrode of the field effect transistor may be supplied with a stable voltage, so that filtering of the operating voltage by a filter factor of 100 to 120 dB, that would otherwise be required, may be eliminated. It is possible further to apply a constant current and/or regulate the current supplied by utilizing the output signal of the operational amplifier to the source electrode of the field effect transistor.

31 Claims, 2 Drawing Sheets

INFRARED SPACE SURVEILLANCE DETECTOR CIRCUIT

BACKGROUND OF THE INVENTION

1. Field of the Invention

The invention relates to an infrared space surveillance detector circuit layout and more particularly a circuit with a field effect transistor connected following a sensor.

2. Description of the Related Technology

FIG. 1*a* shows a known circuit with a pyroelement P terminal grounded or connected to the negative operating voltage terminal, and a second terminal connected to the gate electrode of a field effect transistor (abbreviated hereafter as FET). The drain electrode of the FET is connected with the positive operating voltage terminal $U_B$. The source electrode of the FET is connected through a resistance $R_A$ to ground or the negative operating voltage $-U_B$. The signal or output voltage $U_A$ is at the FET source. The circuit shown is laid out similar to an emitter follower circuit.

The signal voltage $U_A$ in this circuit layout is highly sensitive to interference voltages superposed on the operating voltage $U_B$. Due to the drain-gate feedback of the FET, interferences of this type affect the gate voltage and thus the signal voltage $U_A$ located within the microvolt range. The operating voltage $+U_B$ applied to the drain electrode of the FET comprises noise or interference components in the microvolt range, therefore the sensor signal cannot be evaluated with adequate reliability for the emission of the signal. It is therefore necessary to thoroughly filter the operating voltage $U_B$, i.e., a network component with a high filter factor of 100 to 120 dB is required. In order to obtain such a high filter factor, two network components are often connected in series. The circuitry needed to filter the operating voltage $U_B$ is thus extensive.

An alternative circuit (FIG. 1*b*) may be arranged with an output at the drain electrode of an FET. There is a resistance $R_L$ connected between the operating voltage $+U_B$ and the output. The source electrode is connected to a parallelly arranged resistance $R_A$ and capacitor C.

In addition to the disadvantages present in the circuit of FIG. 1*a*, the circuit of FIG. 1*b* results in the noise and interference components superposed on the supply voltage being superposed on the output or signal voltage $U_A$ appearing at the resistance $R_L$. The feedback admittance of the drain-gate transition of the FET results in an even worse signal/noise ratio of the signal voltage $U_A$.

SUMMARY OF THE INVENTION

It is an object of the invention to provide a circuit layout capable of operating without a large filtering effort in the network part and enabling a high degree of amplification of the sensor signal in a simple manner.

This object is attained by connection of the drain electrode of the FET to the negative input of an operational amplifier, with feedback through a resistance to the negative input.

The connection of an operational amplifier to the FET according to the invention enables utilization of the operational amplifier stabilization, which yields an 80 to 100 dB attenuation. In the process the drain voltage of the FET is maintained stable without an additional filter circuit and therefore produces practically no reaction on the gate electrode of the FET. The operational amplifier circuit thus automatically regulates all fluctuations of the network voltage output, the drain voltage of the FET remains constant and an undisturbed useful signal and an undisturbed signal voltage are obtained. Expressed in different terms, the operational amplifier is connected in the circuit layout according to the invention not as a voltage amplifier but as a current amplifier, whereby fluctuations at the negative input and thus at the drain electrode of the FET are suppressed, with the consequence that no interference reactions appear at the gate electrode of the FET.

It is particularly advantageous to choose an operational amplifier with a high inlet resistance or input impedance. C-MOS operational amplifiers are especially suitable for the purpose. It is, however, possible to use operational amplifiers with lower Ohm values, particularly when the operating voltage is filtered, for example by a preceding network component with a filter factor of 20 to 30 dB.

A particularly advantageous embodiment of the invention comprises providing the source electrode of the FET with a constant current by means of a constant power source. In place of the conventional RC combination in the source electrode zone, the dc value of the output signal may be maintained even more constant by the use of a stabilized power source.

A further highly advantageous possibility is feeding the output signal of the operational amplifier to the constant power source as a regulating signal. The output signal of the operational amplifier is thus fed back by means of the constant power source, so that the outlet voltage and the rest current of the output voltage is maintained in a stable state.

A further feature of the invention may include providing the constant power source in the form of a feedback quadripole of four pole network. It is particularly advantageous to use an integration network in connection with the four pole network. This enables operation of the entire circuit layout in the open loop gain mode.

It is advantageous for the feedback quadripole to comprise an attenuation element with an attenuation factor regulated proportionally to the overall amplification of the detector circuit layout. In this manner, constant amplification of the useful signal is assured, while manufacturing, structural component, temperature and other tolerances are eliminated. As the result of this amplification, controlled embodiment of the circuit can be produced in a particularly cost effective manner, as simple structural elements with high tolerances may be used without requiring compensation.

BRIEF DESCRIPTION OF THE DRAWINGS

The invention is explained in more detail by an example with reference to the drawings. In the drawings.

DETAILED DESCRIPTION OF THE PREFERRED EMBODIMENT

Figure 1A:
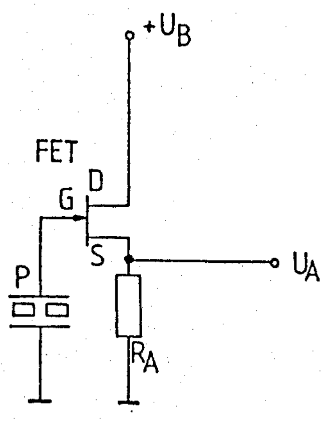
FIGS. 1*a* and 1*b* show schematic diagrams of conventional circuit layouts.
Figure 1B:
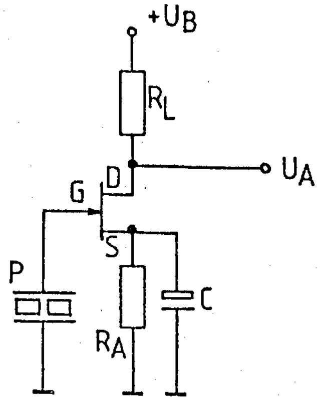
Figure 2:
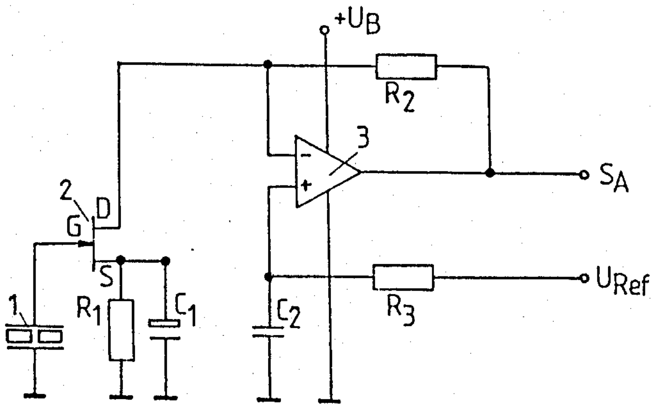
FIG. 2 shows a schematic diagram of a circuit layout according to the present invention.
Figure 3:
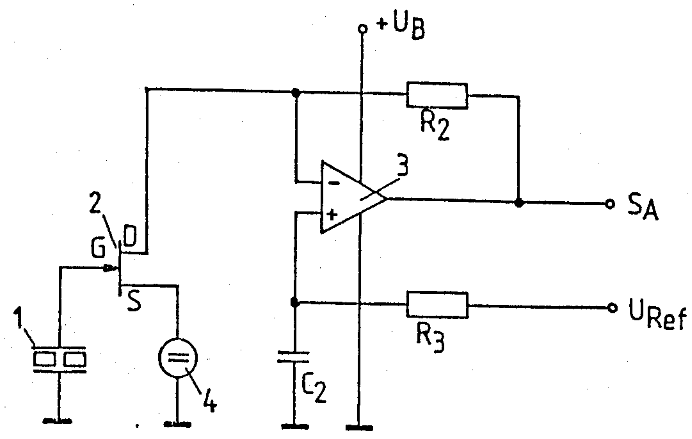
FIG. 3 shows an advantageous modification of the circuit layout shown in FIG. 2.
Figure 4:
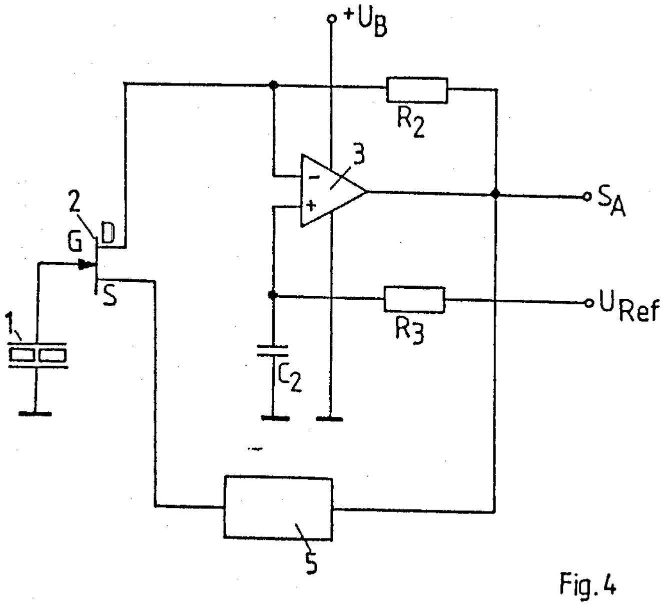
FIG. 4 shows an alternative embodiment of the invention.

Circuit and structural components which correspond to each other in FIGS. 2 to 4 are assigned identical reference symbols.

As shown in FIG. 2, the gate electrode of a field effect transistor 2 is connected to a first terminal of a pyroelement 1. The second terminal of the pyroelement 1 is grounded or connected to a negative operating voltage source. The source electrode of the FET 2 is connected to a parallel resistance $R_1$ and capacitor $C_1$, connected in turn to the ground or the negative operating voltage. The drain electrode of the FET 2 is connected with the negative input of an operational amplifier 3. The positive input of the operational amplifier 3 is connected through a capacitor $C_2$ to ground or the negative operating voltage. The positive input of the operational amplifier 3 is connected to a reference voltage $U_{Ref}$ through a resistance $R_3$. The output signal $S_A$ of the operational amplifier 3 is fed back to the operational amplifier negative input through resistance $R_2$. The resistance $R_2$ is preferably in the mega-Ohm range. The resistance $R_2$ may have a value of 1 MOhm. The operating voltage terminals of the operational amplifier 3 are connected respectively with the positive operating voltage terminal $+U_B$ and the negative operating voltage terminal $-U_B$ or the ground.

The output signal of the pyroelement 1 appearing at the drain electrode of the FET 2 is amplified by the operational amplifier 3 and the amplified signal is fed back to the negative inlet of the operational amplifier 3 by the feedback branch comprising the resistance $R_2$. As the operational amplifier itself has a good filter effect of approximately 80 to 100 dB for the supply voltage, this property of the operational amplifier is utilized in addition to the amplifying effect itself for the useful signal, in order to maintain a stable drain voltage of the FET 2. There is no negative reaction of the drain electrode on the gate electrode as a result so that to this extent there is no negative effect on the useful signal. The operational amplifier circuit thus regulates all of the fluctuations out, so that the drain voltage remains entirely constant. The useful signal is exposed in the process not to voltage amplification but to current amplification. It therefore remains free of fluctuations or interference components potentially occurring in the operating voltage.

The embodiment shown in FIG. 3 differs from the circuit layout of FIG. 2 merely by replacement of the parallel resistance $R_1$ and capacitor $C_1$ by a constant current source 4. In this manner, the dc value of the useful signal $S_A$ may be maintained in an even more constant manner.

In the embodiment shown in FIG. 4 the source electrode branch of the FET 2 is connected to a constant current source or a feedback quadripole 5 rather than the grounded constant current source 4 or a parallel resistance $R_1$ and capacitor $C_1$. The output signal $S_A$ of the operational amplifier 3 is applied to the quadripole as a control signal. The constant current source is fed back by the dc voltage output of the operational amplifier 3 to stabilize the dc voltage or rest voltage value of the output signal. The feedback quadripole or four pole network 5 may include an operational amplifier, transistor or current level circuit. An operational amplifier network may exhibit negative feedback through a resistive and capacitive element. The output signal of the regenerative constant current source or the feedback quadripole 5 may be additionally amplified prior to entering the source electrode of the FET 2. Circuit part 5 may include an integrating network for attenuation of the signal in order to operate the entire circuit in the open loop gain mode, so that an amplification regulated concept is present. The integration network may be an operational amplifier with feedback through a capacitor. Further, the feedback quadripole or four pole network may be an attenuating network with an attenuation factor exactly of the magnitude of the overall amplification of the circuit layout desired.

The present invention has been explained hereinabove by an exemplary embodiment. Numerous modifications and configurations of the embodiment shown are within the ability of those skilled in the art without exceeding the concept of the invention.

I claim:

1. An infrared space surveillance detector circuit comprising:
   - a sensor;
   - a field effect transistor or FET responsive to said sensor; and
   - a negative feedback operational amplifier stage connected to a drain electrode of said FET;
   - the drain electrode of said FET connected to and biased by the output of said amplifier stage and connected to and providing an inverting input of said amplifier stage.

2. A circuit according to claim 1 wherein said operational amplifier exhibits a high input impedance.

3. A circuit according to claim 2 further comprising:
   - a constant current source connected to a source terminal of said FET.

4. A circuit according to claim 3 wherein an output of said operational amplifier is connected to a control input of said constant current source.

5. A circuit according to claim 4 wherein said constant current source is a feedback quadripole.

6. A circuit according to claim 5 wherein said feedback quadripole is an integrated element for attenuation of said operational amplifier output.

7. A circuit according to claim 5 wherein an attenuation element of said feedback quadripole exhibits an attenuation factor controlled proportionally to an overall circuit amplification.

8. A circuit according to claim 3 wherein said constant current source is a feedback quadripole.

9. A circuit according to claim 8 wherein said feedback quadripole is an integrated element for attenuation of said operational amplifier output.

10. A circuit according to claim 9 wherein an attenuation element of said feedback quadripole exhibits an attenuation factor controlled proportionally to an overall circuit amplification.

11. A space surveillance detector circuit comprising:
   - a sensor;
   - an FET stage responsive to said sensor; and
   - a current amplification stage responsive to a drain electrode of said FET stage and providing biasing for said FET stage from an output of said current amplification stage.

12. A circuit according to claim 11 wherein said current amplification stage comprises an operational amplifier network.

13. A circuit according to claim 12 wherein said operational amplifier network exhibits a high input impedance.

14. A circuit according to claim 13 wherein said sensor is an infrared radiation sensor.

15. A circuit according to claim 14 wherein said FET stage comprises a constant current source.

16. A circuit according to claim 15 wherein said constant current source is a four pole network.

17. A circuit according to claim 16 wherein said four pole network is an integrating amplifier responsive to an output of said current amplification stage.

18. A circuit according to claim 17 wherein said integrating amplifier exhibits an attenuation factor controlled proportionally to an overall circuit amplification.

19. An infrared space surveillance circuit comprising:
a sensor;
an FET connected to said sensor;
means for suppressing drain voltage fluctuations connected to a drain terminal output of said FET wherein said means for suppressing includes a negative feedback operational amplifier with an output connected to bias said drain terminal.

20. A circuit according to claim 1, wherein a negative input terminal of said operational amplifier stage is connected to a drain output terminal of said FET.

21. A circuit according to claim 1, wherein said sensor is connected to a gate electrode of said FET, said drain electrode is connected to a negative input of said operational amplifier stage, and a feedback resistor is connected between said negative input and an output of said operational amplifier.

22. An infrared space surveillance detector circuit comprising:
a sensor;
a field effect transistor or FET responsive to said sensor;
a negative feedback high input impedance operational amplifier stage responsive to said FET; and
a constant current source connected to said FET, wherein an output of said operational amplifier is connected to a control input of said constant current source.

23. A circuit according to claim 22 wherein said constant current source is a feedback quadripole.

24. A circuit according to claim 23 wherein said feedback quadripole is an integrated element for attenuation of said operational amplifier output.

25. A circuit according to claim 23 wherein an attenuation element of said feedback quadripole exhibits an attenuation factor controlled proportionally to an overall circuit amplification.

26. An infrared space surveillance detector circuit comprising:
a sensor;
a field effect transistor or FET responsive to said sensor;
a negative feedback high input impedance operational amplifier stage responsive to said FET; and
a constant current source connected to said FET, wherein said constant current source is a feedback quadripole.

27. A circuit according to claim 26 wherein said feedback quadripole is an integrated element for attenuation of said operational amplifier output.

28. A circuit according to claim 27 wherein an attenuation element of said feedback quadripole exhibits an attenuation factor controlled proportionally to an overall circuit amplification.

29. A space surveillance detector circuit comprising:
an infrared radiation sensor;
a constant current source four pole network FET stage responsive to said sensor; and
a high input impedance operational amplifier network current amplification stage responsive to an output of said FET stage.

30. A circuit according to claim 29 wherein said four pole network is an integrating amplifier responsive to an output of said current amplification stage.

31. A circuit according to claim 30 wherein said integrating amplifier exhibits an attenuation factor controlled proportionally to an overall circuit amplification.

* * * * *